United States Patent
Chung et al.

(10) Patent No.: US 7,603,127 B2
(45) Date of Patent: Oct. 13, 2009

(54) BOOSTING A SIGNAL-TO-INTERFERENCE RATIO OF A MOBILE STATION

(75) Inventors: Sae-Young Chung, Waltham, MA (US); Dae-Young Kim, Lexington, MA (US); M. Vedat Eyuboglu, Concord, MA (US); Gopal Harikumar, Waltham, MA (US)

(73) Assignee: Airvana, Inc., Chelmsford, MA (US)

( * ) Notice: Subject to any disclaimer, the term of this patent is extended or adjusted under 35 U.S.C. 154(b) by 203 days.

(21) Appl. No.: 09/976,240

(22) Filed: Oct. 12, 2001

(65) Prior Publication Data

US 2003/0100311 A1 May 29, 2003

(51) Int. Cl.
*G06F 15/16* (2006.01)

(52) U.S. Cl. ........................... 455/453; 455/447

(58) Field of Classification Search .................. 455/446, 455/447, 448, 449, 453, 63.1, 63.2, 63.4, 455/67.13
See application file for complete search history.

(56) References Cited

U.S. PATENT DOCUMENTS

| | | | |
|---|---|---|---|
| 5,838,673 A | 11/1998 | Ritz et al. | |
| 5,864,760 A * | 1/1999 | Gilhousen et al. | 455/442 |
| 5,920,813 A * | 7/1999 | Evans et al. | 455/422.1 |
| 6,069,885 A * | 5/2000 | Fong et al. | 370/336 |
| 6,137,787 A * | 10/2000 | Chawla et al. | 370/337 |
| 6,262,980 B1 * | 7/2001 | Leung et al. | 370/336 |
| 6,400,697 B1 * | 6/2002 | Leung et al. | 370/328 |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,804,512 B1 | 10/2004 | Baker et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 2001/0004592 A1 * | 6/2001 | Schmutz | 455/422 |
| 2002/0146983 A1 * | 10/2002 | Scherzer et al. | 455/67.1 |
| 2002/0196749 A1 | 12/2002 | Eyuboglu et al. | |
| 2003/0100311 A1 | 5/2003 | Chung et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2005/0254467 A1 | 11/2005 | Li et al. | |

(Continued)

FOREIGN PATENT DOCUMENTS

GB 2452688 3/2009

OTHER PUBLICATIONS

T.S. Rappaport, Wireless Communications, Prentice Hall 57-61, (1996).

(Continued)

*Primary Examiner*—Sam Bhattacharya
(74) *Attorney, Agent, or Firm*—Fish & Richardson P.C.

(57) ABSTRACT

In a cell of a cellular wireless communication system, the SIR of at least one user in a sector of the cell is altered by temporarily reducing transmissions on a forward link in at least one other sector of the cell or a sector in another cell in accordance with a pattern.

18 Claims, 2 Drawing Sheets

U.S. PATENT DOCUMENTS

| | | |
|---|---|---|
| 2006/0003794 A1 | 1/2006 | Chung et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Palnati et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Sharma et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0082020 A1 | 3/2009 | Ch'ng et al. |
| 2009/0088155 A1 | 4/2009 | Kim |
| 2009/0116445 A1 | 5/2009 | Samar et al. |

OTHER PUBLICATIONS

3GPP2, CDMA2000, High Rate Data Packet Interface Specification, Ballot Resolution Version, Sep. 12, 2000.

Niranjan Joshi and Srinivas Kadaba, Reverse Link Structure for 1xEV-DV, Sep. 20, 2000.

Oguz Sunay, 1xEV-DV Forward Channel Structure, Sep. 20, 2000.

Office action and response history as of May 14, 2009 of U.S. Appl. No. 11/222,475, Patent No. 7,242,958.

File history of U.S. Appl. No. 11/222,475, Patent No. 7,242,958.

\* cited by examiner

BOOSTING A SIGNAL-TO-INTERFERENCE RATIO OF A MOBILE STATION

BACKGROUND

This invention relates to boosting a signal-to-interference ratio of a mobile station.

In our discussion, we use the following acronyms:

| | |
|---|---|
| MS | Mobile Station |
| BS | Base Station |
| CDMA | Code Division Multiple Access |
| FDMA | Frequency Division Multiple Access |
| TDMA | Time Division Multiple Access |
| SIR | Signal to Interference Ratio |
| HARQ | Hybrid ARQ |
| ARQ | Automatic Repeat Request |
| GSM | Groupe Speciale Mobile of the European Telecommunication Standards Institute. |
| AMPS | Advanced Mobile Phone Service |
| CDMA 2000 | Third generation CDMA standard for mobile wireless communication. |
| 1xEV-DO | 1x Evolution Data Only standard. |
| 3GPP2 | Third Generation Partnership Project 2 |

In a wireless communication system, limited available resources such as frequency and time are shared among the users of the system. As shown in FIG. 1, in a cellular system 10, a covered area is divided into cells 12, and each cell is served by a base station (BS) 14. To increase capacity for a given frequency spectrum being used, a BS's service area may be further divided into sectors 16, for example, three sectors, using directional antennas, as described in T. S. Rappaport, *Wireless Communications*. Prentice Hall, 1996. Some cellular systems, such as TDMA (GSM, IS-54) and FDMA (AMPS), use so-called frequency reuse or frequency planning to increase communication capacity.

In a frequency reuse system, the same frequency channels are reused in multiple cells. In FIG. 1, for example, all three cells 12, 13, 15 have sectors 16, 18, 20 that bear a given letter (e.g., the letter "C") indicating that they use the same frequency channel.

Frequency reuse helps users at cell edges, for example, user 22, located at the edge 24 of a cell to achieve a better signal to interference ratio (SIR).

As more and more carrier frequencies are used for frequency reuse, the SIRs of the users in a given cell get better and the SIR distribution among users of the cell gets more even. However, the spectral efficiency gets lower, which will result in lower total system capacity for a given total spectrum.

CDMA systems such as IS-95A/B, CDMA-2000, and 1xEV-DO incorporate maximal frequency reuse in which neighboring cells use the same carrier frequency, i.e., the reuse factor (defined as the number of frequency channels used)=1. Different codes are used to differentiate different cells. This system yields good spectral efficiency, but the SIR distribution within a cell can be uneven depending on the location of the user.

The SIR of a user at a given location is determined by the locations and configurations (e.g., omni cell or three-sectored cell) of the cells. The SIR in turn determines the instantaneous communication rate of the user.

Recently, 3GPP2 approved a new wireless packet data air interface standard called IS-856, sometimes also referred to as 1xEV-DO. IS-856 provides the capability to support high-speed wireless Internet communication at speeds up to 2.45 Mbit/s using only 1.25 MHz spectrum.

FIG. 2 shows an example, for 1xEV-DO, of the percentage distribution of forward link rates of users who are uniformly distributed geographically within a three-sectored cell. As can be seen from the figure, the lowest and highest rates, 38.4 kbps and 2.4 Mbps, differ by a factor of 64. This large difference in rate makes it hard to achieve an even throughput to all users in a cell, as is required for constant bit-rate applications such as voice. For data applications, a certain degree of unfairness, e.g., giving higher throughput for users who are close to the BS and lower throughput for users who are far from the BS, is allowed as long as it does not violate certain fairness conditions.

Because the forward link of 1xEV-DO is TDMA, it is possible to allocate different amounts of time for each user to increase the fairness, i.e., by giving more time slots for low SIR users and fewer time slots for high SIR users. However, this will lower the throughput of the overall system because low SIR users will consume a large share of the resources. Systems designed to increase fairness tend to reduce sector throughput.

SUMMARY

In general, in one aspect, the invention features a method that includes in a cell of a cellular wireless communication system, altering the SIR of at least one user in a sector of the cell by temporarily reducing transmissions on a forward link in at least one other sector of the cell or a sector in another cell in accordance with a pattern.

Implementations of the invention may include one or more of the following features. The pattern is organized in a sequence of time slots, and the pattern defines which of the sectors has transmissions turned on or off in each of the time slots. The pattern comprises a predetermined fixed pattern that is repeated as time passes. A current state of transmissions is determined in at least one of the sectors of the cell or a sector in another cell, and the pattern is set dynamically based on the determined state of the transmissions. The current state of transmissions includes the scheduling status of transmissions in neighboring sectors in the cell or in one or more other sectors in one or more other cells. Neighboring sectors include other sectors in the cell and sectors in some other cells. The current state of transmissions includes the transmission rates of some neighbor sectors. The current state of transmissions includes the next time slot usage. The current state of transmissions includes the forward link SIR. The current state of transmissions includes user location. The current state of transmissions includes a fairness setting. The current state of transmissions includes an application type of user and/or QoS. The transmissions are temporarily reduced by turning transmissions on and off in selected sectors according to the pattern. The pattern includes turning off transmissions in other sectors more frequently to help users having lower communication rates. A frequency reuse factor of one or higher is used in the wireless system. The wireless system comprises 1xEV-DO.

In general, in another aspect, the invention features apparatus that includes (a) wireless transmission facilities for more than one sector of a cell, and (b) control facilities connected to the wireless transmission facilities and configured to alter the SIR of at least one user in a sector of the cell by temporarily reducing transmissions on a forward link in at least one other sector of the cell or a sector in another cell in accordance with a pattern. Implementations of the invention may include one or more of the following features. The control facilities comprise sector controllers for controlling the wireless transmission facilities for the respective sectors.

In general, in another aspect, the invention features a medium bearing intelligence configured to enable a machine to effect the actions that comprise: in a cell of a cellular wireless communication system, altering the SIR of at least one user in a sector of the cell by temporarily reducing transmissions on a forward link in at least one other sector of the cell or a sector in another cell in accordance with a pattern.

In general, in another aspect, the invention features apparatus that includes a sector controller adapted to control transmissions in a sector of a cell of a wireless communication system and to communicate with other sector controllers in the cell or in one or more other cells to coordinate the turning on and off of transmissions in at least one of the sectors based on the transmission state in at least another one of the sectors.

Other advantages and features will become apparent from the following description and from the claims.

DESCRIPTION

Figure 1:
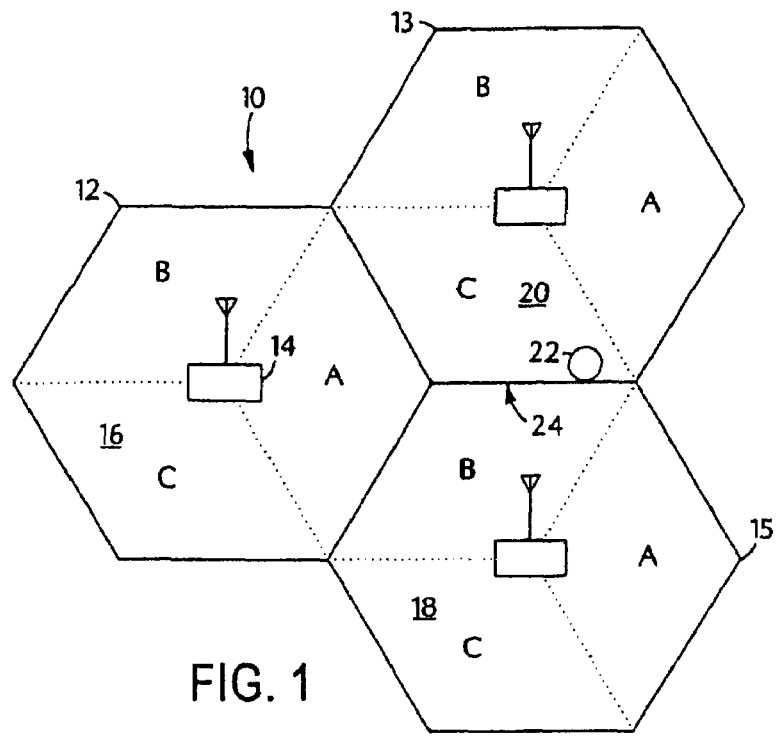
FIG. 1 shows frequency or time reuse factor of three.

Here, we propose a system in which some BS's turn off their transmissions in forward links to boost the SIR of a user in a bad location and thereby achieve good rates and more even rates among users in a cell. By employing this technique, the system can achieve a more concentrated rate distribution (less variance in the rate) than shown in FIG. 2 and thereby can provide more even throughput to users and increase the sum of throughput of all users in a sector, i.e., the sector throughput.

This system can be thought of as a time reuse system in which different sectors use different time slots to boost SIR of users in the respective sectors. Unlike a frequency reuse system, the time reuse pattern can be easily adjusted dynamically based on an SIR measurement, the location of the user, the application type being run on the user's device, or configuration data such as a fairness setting, e.g., a setting that guarantees a certain limit on the ratio of the maximum and minimum user throughput or a minimum throughput. Also, the time reuse pattern may be disabled easily.

Although we shall explain the benefits of time division multiplexing among sectors in the context of an example that concerns 1xEV-DO systems, benefits can be achieved in other wireless systems, including TDMA, CDMA, and OFDM systems.

Let M be the number of sectors in a cell. We assume a frequency reuse factor of one, i.e., every sector in a cell uses the same frequency. We assume that the same number, K, of active MSs are operating in each sector. The analysis can be generalized to cover cases in which different numbers of MSs are operating in respective sectors.

We assume each MS chooses the best serving sector from which to download data, although, in reality, there can be some delay in switching sectors.

We consider two cases of time reuse: fixed and adaptive. In a fixed time reuse pattern, sectors are turned off at times that are defined by a pre-determined pattern. In an adaptive reuse pattern, the timing of the turning off of sectors depends on the status of the system such as the next time slot usage in each sector. For example, when a low-rate user is using the next time slot in a sector, some neighbor sectors can be turned off during the slot to help the disadvantaged user.

Fixed Reuse Pattern

Let S be a local group of sectors in a cell whose transmission states (on and off) will be controlled jointly. S could be fewer than all of the sectors in the cell. Assume that the pattern of on and off states is repeated in successive control periods, and that each control period includes a number L of time slots. Let Si be the set of sectors allowed to transmit in the time slot Ti, where i=1, . . . , L. Such a pattern is illustrated in the following table for the case of four sectors in S and four time slots. The lengths of time slots Ti's can be different in general.

|  | T1 | T2 | T3 | T4 |
| --- | --- | --- | --- | --- |
| Sector 1 | On | Off | On | Off |
| Sector 2 | Off | On | On | Off |
| Sector 3 | On | Off | Off | On |
| Sector 4 | Off | On | Off | On |

In this example, S={Sectors 1, 2, 3, and 4}, S1={Sectors 1 and 3}, S2={Sectors 2 and 4}, S3={Sectors 1 and 2}, and S4={Sectors 3 and 4}.

Another example is shown in FIG. 1, where S contains three sectors in a cell, S1={A}, S2={B}, S3={C}, and there are three time slots T1=T2=T3=T.

Figure 2:
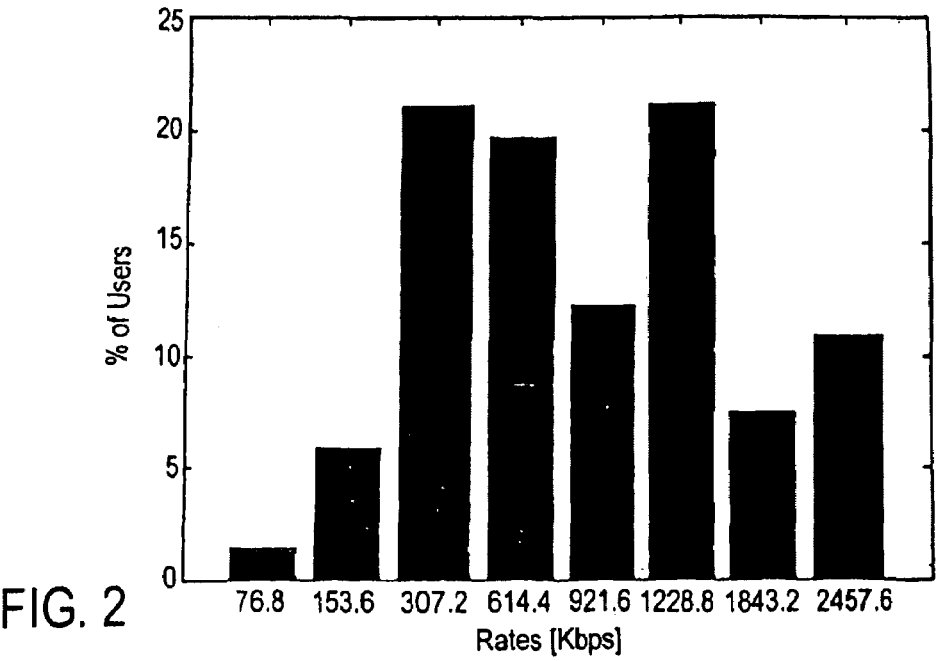
FIG. 2 shows a bar chart of rate distribution for frequency or time reuse factor of one.
Figure 3:
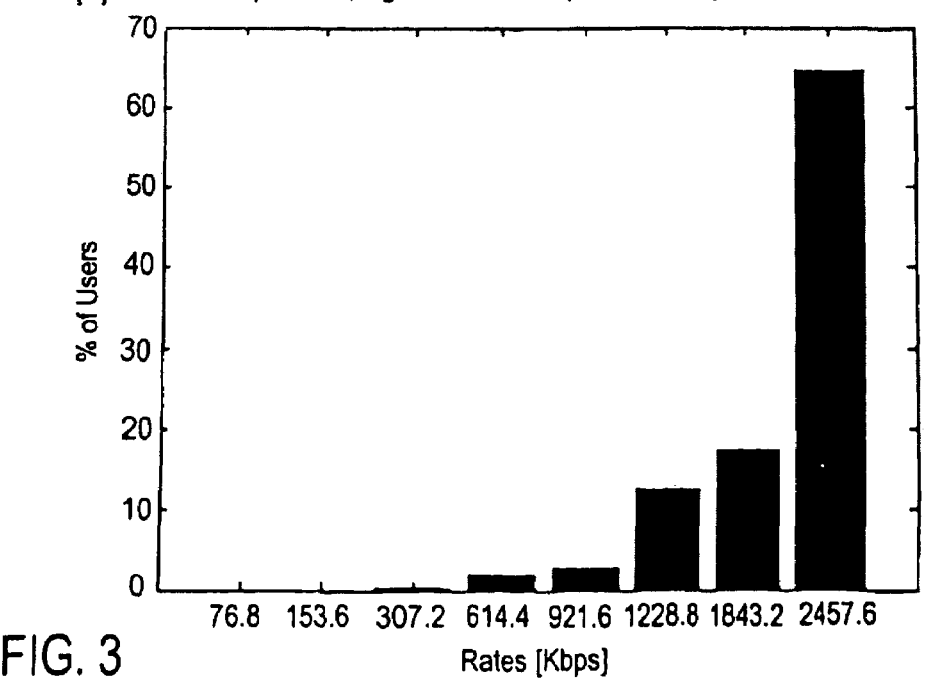
FIG. 3 shows a bar chart of a rate distribution for frequency or time reuse factor of three.

In FIG. 3, we show the percentage distribution of users by rate for this case, representing a clear improvement in the throughput compared to the distribution of FIG. 2. (Because each of the sectors is active only for ⅓ of the time, the throughput needs to be scaled down by a factor of 3.)

We use two quantities to measure performance. We define the equal-time throughput E[R], where R is the instantaneous rate, per cell per carrier as the expected cell throughput per carrier (the 1.25 MHz band in case of 1xEV-DO), i.e., the average rate of a user randomly located in the sector. This is the cell throughput per carrier under the condition that every user gets the same amount of serving time. We define the equal-data throughput 1/E[1/R] per cell per carrier as the expected cell throughput per carrier when each user downloads the same amount of data independent of its channel condition, which is equal to the inverse of the expected value of the inverse of the rate R. These throughput values will be scaled down by the reuse factor to include the effect of reduced time usage due to time reuse.

In the example above (FIG. 1), we get the following simulation results assuming 19 hexagonal three-sectored cells:

|  | E[R] | 1/E[1/R] | FIG. |
| --- | --- | --- | --- |
| Time reuse = 1 | 2923 kbps | 1520 kbps | 2 |
| Time reuse = 3 | 2105 kbps | 1864 kbps | 3 |
| Gain | −28% | 23% |  |

Although we lose 28% in equal-time throughput, we gain 23% in equal-data throughput when the time reuse=3 is used. Therefore, the time reuse of three in this example improves performance of systems with high fairness among users.

In 1xEV-DO, even when the data portion of a time slot is empty, the pilot portion is transmitted. The MS then determines its DRC (Data Rate Control, i.e., the rate at which the MS asks a sector to send data in the forward link) based on the pilot only. Therefore, even when the data portions of time slots from interfering sectors are empty, and therefore the MS could receive at high rate, its DRC will still be low. Even though the BS normally would transmit to the sector at the rate (here, the low rate) that the MS has requested, it is still possible to take advantage of the boosted channel condition that time reuse provides. For example, 1xEV-DO uses HARQ, which permits the MS to send an ACK signal to alert the sector to stop transmission of the remaining slots of multi-slot packets and thereby effectively increase the transmission rate.

Adaptive Reuse Pattern

Forward link capacity can be improved by a time reuse scheme that is adaptive. Let $I=\{I_i|i=1,\ldots,M-1\}$ represent the set of interferences from other sectors, where $I_i$ denotes the ratio of the interference from the i-th sector to the power from the serving sector for a user (the serving sector is the sector from which the user is receiving packets), $M>>1$ is the total number of sectors. Let N denote the ratio of the noise to the power in the serving sector. We assume $I_i$ and N are random variables that depend on the user location and shadow fading. To simplify the derivation, we assume no Rayleigh fading (thus no multi-user diversity gain).

Then, channel capacity C is given by $$C = \log_2\left(1 + \frac{1}{N + I_A}\right) \; [b/s/\text{Hz}],$$

where $I_A=\text{sum}(I_i, i=1,\ldots,M-1)$ is the aggregate interference from other sectors.

Let $m=m(I_A)$ be the number of other sectors with largest $I_i$'s to be turned off during transmission for the current user. m is a random variable that depends on $I_A$ (or equivalently the DRC of the user with a little less accuracy). m could be a function of $I_i$'s in general, but that could make the system too complicated.

Let q(N,I) be the relative serving time for a user characterized by $\{N,I\}$, i.e., $E[q(N,I)]=1$. For example, for Qualcomm's fair proportional scheduler (Qualcomm, 1xEV Scheduler: Implementation of the Proportional Fair Algorithm, Application Note, 80-85573-1 X5, Jun. 27, 2001), if all queue's are backlogged, or when each user receives data whose amount is proportional to its supportable rate, then q(N,I)=1. If every user has the same amount of data to receive, then q(N,I)=1/R(N,I)/E[1/R(N,I)], where R(N,I) is the rate supportable at {N,I}. We simply denote q(N,I) by q and call it the user bandwidth vector.

Let α denote $$\frac{E[q]}{E[q(m+1)]} = \frac{1}{E[q(m+1)]},$$

which is the average fraction of time a sector is turned on during the period assuming there is no sector with an empty queue. The channel capacity C' of this time reuse scheme becomes:

$$C' = \alpha \, \log_2\left(1 + \frac{1}{N + \beta(I_A - I_m)}\right) \; [b/s/\text{Hz}],$$

where $I_m$=sum of m largest $I_i$'s. $0 \leq \beta \leq 1$ is the factor that reduces the interference as a bonus of turning off some sectors. That is, turning off some sectors not only reduces the interference $I_A$ by $I_m$, but also reduces the interference further because other sectors are also turned off during the period. Because there is no HARQ for high rate packets, i.e., one-slot packets with rates 1842.3 or 2457.6 kbps, these rates will not usually benefit from the reduced β. This effect would produce only a minor degradation on R' when q' is inversely proportional to R'. If there is an adaptive DRC estimation algorithm employed in MSs that can estimate the increased SNR due to some silent sectors, the 1843.2 kbps rate would benefit, i.e., it could become 2457.6 kbps sometimes.

If we make the unrealistic assumption that sectors are perfectly coordinated so that when a sector needs to be turned off in the next time slot to boost the SIR of a MS, it does not have any packet to send in the slot, we get β=α. Because there is some correlation in the times when neighbor sectors are turned off, β would usually be slightly larger than α. The difference would widen (slightly) if m is large because other sectors will have less chance to be turned off in that m sectors are already turned off and there is no traffic in those m sectors. However, E[β] would be close to α. Therefore, we assume β=α.

Analysis and Simulation Results

Because channel capacity increases only logarithmically at large SNR, and the adaptive reuse technique does not help high rate communications, we arrange to turn off sectors only for users with low rates. Using a low-SNR approximation, we get the achievable rate R, i.e., $$R \approx \lambda \frac{1}{N + I_A} \; [b/s/\text{Hz}], \quad (1)$$

where $\lambda \approx 0.5$ at rates 38.4~1228.8 Kbps and $\lambda \approx 0.25$ at rates 1843.2~2457.6 Kbps in a 1xEV-DO system. Because we are not attempting any improvement for high rate users, we can safely assume λ=0.5 for the analysis of the throughput improvement for low-rate users.

The improved rate R' becomes $$R' \approx \lambda \frac{\alpha}{N + \beta(I_A - I_m)} \; [b/s/\text{Hz}].$$

This approximation will be accurate if the improved SNR=

$$\frac{1}{N + \beta(I_A - I_m)}$$

is less than about two, i.e., we can still assume λ=0.5. We use $$\alpha = \frac{1}{E[q'(m+1)]}$$

for the adaptive reuse case, since q' depends on the improved R' in general.

Based on the user bandwidth vectors q and q' for the original case (time reuse=1) and the adaptive reuse case, we get the sector throughputs S=E[q R] and S'=E[q' R'] for the original case and the adaptive reuse case, respectively. In the following throughput analysis, we demonstrate how much gain we can get using adaptive reuse.

Case I (Time Reuse=1)

For case I, $q=1/R/E[1/R]$ and $q'=1/R'/E[1/R']$

In this case, we assume $\beta=\alpha$. S and S' become $$S \approx \frac{1}{E[N/\lambda] + E[I_A/\lambda]} \text{ and}$$

$$S' \approx \frac{1}{E[N/\lambda]/\alpha + E[I_A/\lambda] - E[I_m/\lambda]}.$$

If N is sufficiently small (if not coverage limited, i.e., cell sizes are small), then S' will be always greater than S. Although $\lambda$ depends on the rate R and R' for the original and the adaptive cases, respectively, we simply assume $\lambda$ is a function of R because we are not attempting to increase R' for high rate users and in this case $\lambda$ is almost constant anyway.

Assuming N=0, we get $$\alpha = \frac{E[(I_A - I_m)/\lambda]}{E[(I_A - I_m)(m+1)/\lambda]}.$$

In this case, the throughput gain $g=S'/S$ becomes $$g = \frac{E[I_A/\lambda]}{E[(I_A - I_m)/\lambda]}.$$

We assume hexagonal three-sectored cells, an antenna pattern defined in the 1xEV-DV evaluation methodology document (3GPP2, 1xEV-DV Evaluation Methodology-Addendum (V5)), and shadow fading of 8.9 dB with base station correlation of 0.5. We randomly locate 10,000 users uniformly and find the serving sector and the set of interferences I for each user. The following table summarizes the rate R and its occurrence.

| Rate [kbps] | Fraction of users |
| --- | --- |
| 38.4 | 0.0002 |
| 76.8 | 0.0169 |
| 153.6 | 0.0875 |
| 307.2 | 0.2116 |
| 614.4 | 0.1749 |
| 921.6 | 0.0979 |
| 1228.8 | 0.1898 |
| 1843.2 | 0.0702 |
| 2457.6 | 0.1510 |

We choose the distribution of m as a function of R to maximize the gain g given that $\alpha \geq \alpha_0$ for various thresholds $\alpha_0$. We show results for different values of $\alpha_0$. Although we get better results by reducing $\alpha$, making $\alpha$ too small would have undesirable effects such as increasing noise N by $1/\alpha$. We limit m to be less than or equal to 0, 10, 5, and 1 for R=38.4, 76.8, 153.6, and 307.2, respectively. We set m=0 for R=38.4 kbps because it does not affect the performance much due to its small probability of occurrence. For rates >307.2 kbps, we assume m=0. The following table shows optimized m(R)'s for various thresholds $\alpha_0$.

| $\alpha_0$ | {m(76.8), m(153.6), m(307.2)} | g-1 | $\alpha$ |
| --- | --- | --- | --- |
| 0.9 | {1, 0, 0} | 1% | 0.93 |
| 0.8 | {10, 0, 0} | 7% | 0.81 |
| 0.7 | {2, 0, 1} | 17% | 0.71 |
| 0.6 | {1, 1, 1} | 24% | 0.62 |
| 0.5 | {0, 5, 1} | 41% | 0.52 |
| 0.0 | {10, 5, 1} | 55% | 0.42 |

For example, the final line of the table indicates that a throughput gain of 55% is possible if the number of sectors that are turned off for each of the three rates indicated at the top of the table are respectively 10, 5, and 1. The average time during which sectors are turned off is 58%.

This result shows that turning off as many sectors as possible results in the best performance. The adaptive reuse scheme for 38.4 Kbps users does not change the above result much because they do not occur often anyway, but increasing m for those users will improve their user experience.

The following table summarizes how much gain is possible for each rate when {10,5,1} is used for the m(R)'s. It shows that the adaptive reuse scheme can improve the throughput of low rate users by as much as 352% even after the penalty due to silent periods. The improved rates divided by $\alpha$ are all within our valid approximation range. However, some users may have highly improved rates that are outside our valid approximation range. Because these numbers already include the penalty that we are not using all time slots, this throughput gain is the real gain in user's experience.

| Original rate [kbps] | Improved rate [kbps] | Throughput gain |
| --- | --- | --- |
| 76.8 | 347 | 352% |
| 153.6 | 513 | 234% |
| 307.2 | 500 | 62% |

Case II

For case II, $q=q'=1$

In this case, S and S' become $$S \approx E\left[\frac{\lambda}{N + I_A}\right] \text{ and } S' \approx E\left[\frac{\alpha\lambda}{N + \beta(I_A - I_m)}\right].$$

Using the same assumptions as in the first case, we get $$\alpha = 1/E[m+1]$$

and $$g = \frac{E[\alpha\lambda/\beta(I_A - I_m)]}{E[\lambda/I_A]},$$

where we assume $\beta=\alpha$ for R<=1.2288 Mbps and $\beta=1$ for R>1.2288 Mbps because high rates do not benefit much from silent sectors and this will have a more significant effect on the throughput gain than in the first case.

In this case, the maximum gain g of one is achieved when m is always zero for all R. This means the adaptive reuse should not be used for this traffic model, which is intuitive because all rates are fair in this case.

EXAMPLES

In this section, we discuss examples of an adaptive time reuse scheme.

Figure 4:
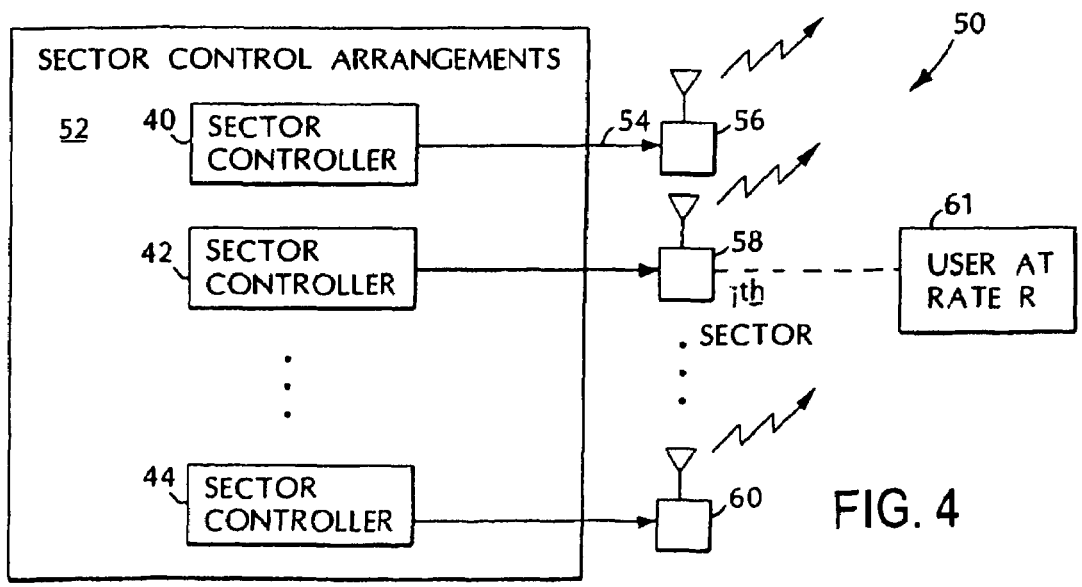
FIG. 4 shows a three-sectored base station

As shown in FIG. 4, the sector control arrangements 52 can be implemented in software, firmware, or hardware running on a base station 50. The sector control arrangements include sector controllers (schedulers) 40, 42, 44 that determine which users in a sector will be served and provide control signals 54 that control the transmission state of the sector antennas 56, 58, ..., 60.

Let $Q_i(R)$ be a set of sectors that ought to be turned off when the i-th sector 58 is transmitting to a user with rate R 61. Let R0 denote a set of rates considered as low rates that need to be boosted by turning off some neighbor sectors. With respect to sector i, the scheduler 42 first determines to which user in the sector to give the next time slot if it is available. If the rate R of the user to whom it will give the time slot is in the set R0, then the scheduler for that sector requests neighbor sectors, e.g., sector 56 in $Q_i(R)$ not to schedule any packet in the next slot if possible. The scheduler 42 schedules a packet to the user 61 regardless of any message to turn off the sector i it might receive from some other sectors.

Otherwise, if the rate R is not within the set R0, the scheduler for the i-th sector waits for any request from neighbor sectors who have the sector i in any of their sets $Q_j(R)$ for any neighbor sector j and any R. If there is no such request, the i-the sector schedules the packet for the user.

Although FIG. 4 implies that the control of the sectors by the sector control arrangements and the sector controllers must occur locally to the BS, the control of sectors can also be handled globally as among different cells and sectors in different cells. Global coordination requires a fast means of communication among BS's, which is not always possible. Local coordination is usually feasible because all decisions are local to a BS.

As another simple example, the fixed reuse pattern example with the reuse factor of three can be modified to produce an adaptive pattern. Assume it is time for sector A to transmit while the other two sectors in the cell are forced to remain silent. Instead of turning off all the other sectors, we may want to allow some of these sectors to transmit at times when the transmission rate in sector A is higher than a threshold, provided that the requested transmission rates of other sectors are also higher than some other thresholds.

Other implementations are within the scope of the following claims. For example, the transmission power in some sectors might be reduced rather than being shut off completely in a celluar system where the transmission power can be controlled.

The invention claimed is:

1. A method comprising:
    in a wireless communication system having sectors including a first sector and a second sector, the first sector being in a first cell, the second sector being in the first cell or in another cell,
    increasing the signal-to-interference ratio of at least one user in the first sector, the at least one user in the first sector being in communication with the communication system only via the first sector,
    the signal-to-interference ratio being increased by
        dynamically reducing transmission power on a forward link in the second sector, determined based on a determination of a current state of transmissions to the at least one user in the first sector and to one or more users in the second sector, each of the one or more users in the second sector being in communication with the communication system only via the second sector, and
        at a later time, increasing the transmission power on the forward link in the second sector.

2. The method of claim 1 in which dynamically reducing the transmissions comprises turning transmissions on and off in selected sectors according to a pattern.

3. The method of claim 1 in which the current state of transmissions includes a status of transmissions scheduled in the second sector.

4. The method of claim 1 in which the current state of transmissions includes transmission rates of the second sector.

5. The method of claim 1 in which the current state of transmissions includes a next time slot usage for at second sector.

6. The method of claim 1 in which the current state of transmissions includes a forward link signal-to-interference ratio of users in the at least one other sector.

7. The method of claim 1 in which the current state of transmissions includes user location.

8. The method of claim 1 in which the current state of transmissions includes a fairness setting for one or more users.

9. The method of claim 1 in which the current state of transmissions includes an application type of one or more users or a quality of service level for one or more users.

10. The method of claim 2 in which the pattern is organized in a sequence of time slots and the pattern defines which of the sectors has transmissions turned on or off in each of the time slots.

11. The method of claim 2 in which the pattern includes turning off transmissions in the second sector more frequently to help users in the first sector having lower communication rates.

12. The method of claim 1 also including arranging a frequency reuse factor of one or higher in the wireless system.

13. The method of claim 1 in which the wireless system comprises 1xEV-DO.

14. Apparatus comprising
    wireless transmission facilities for sectors including a first sector and a second sector of a wireless communication system, the first sector being in a first cell, the second sector being in the first cell or in another cell, and
    control facilities connected to the wireless transmission facilities and configured to:
        increase the signal-to-interference ratio of at least one user in the first sector, the at least one user in the first sector being in communication with the communication system only via the first sector,
    the signal-to-interference ratio being increased by
        dynamically reducing transmission power on a forward link in the second sector, based on a determination of a current state of transmissions to the at least one user in the first sector and to one or more users in the second sector, each of the one or more users in the second sector being in communication with the communication system only via the second sector, and
        at a later time, increasing the transmission power on the forward link in the second sector.

15. The apparatus of claim 14 in which the control facilities comprise sector controllers for controlling the wireless transmission facilities for the respective sectors.

16. Apparatus comprising
    a sector controller adapted to control transmissions in a first sector of a first cell of a wireless communication system, the transmissions in the first sector being to at least one user in the first sector, the at least one user communicating with the communication system only via the first sector, the sector controller further adapted to increase the signal-to-interference ratio of the at least one user in the first sector by communicating with other sector controllers in the first cell or in a second cell to coordinate a dynamic reduction of transmission power on a forward link in a second sector and an increase of the transmission power at a later time, the second sector being in the first cell or in the second cell, wherein the reduction of the transmission power is based on a current state of transmissions to the at least one user in the first sector and to one or more users in the second sector, each of the one or more users in the second sector being in communication with the communication system only via the second sector.

17. The method of claim 1, further comprising:

estimating a signal-to-interference-and-noise ratio based on information received from a mobile station; and determining an encoding and modulation scheme for the data packet based on the estimated signal-to-interference-and-noise ratio.

18. The method of claim 17 wherein each sector transmits a pilot signal and the received information comprises information indicating a strength of one or more of the pilot signals detected by the mobile station.

* * * * *

UNITED STATES PATENT AND TRADEMARK OFFICE
CERTIFICATE OF CORRECTION

PATENT NO. : 7,603,127 B2  Page 1 of 1
APPLICATION NO. : 09/976240
DATED : October 13, 2009
INVENTOR(S) : Sae-Young Chung It is certified that error appears in the above-identified patent and that said Letters Patent is hereby corrected as shown below:

Column 10, line 16, delete "at" and insert --the--.

Signed and Sealed this

Twenty-fourth Day of November, 2009

David J. Kappos
*Director of the United States Patent and Trademark Office*